P. CASTELLANOS.
Apparatus for Recovering Acids from the Residuum of Nitro-Glycerine Manufacture.
No. 164,262.  Patented June 8, 1875.
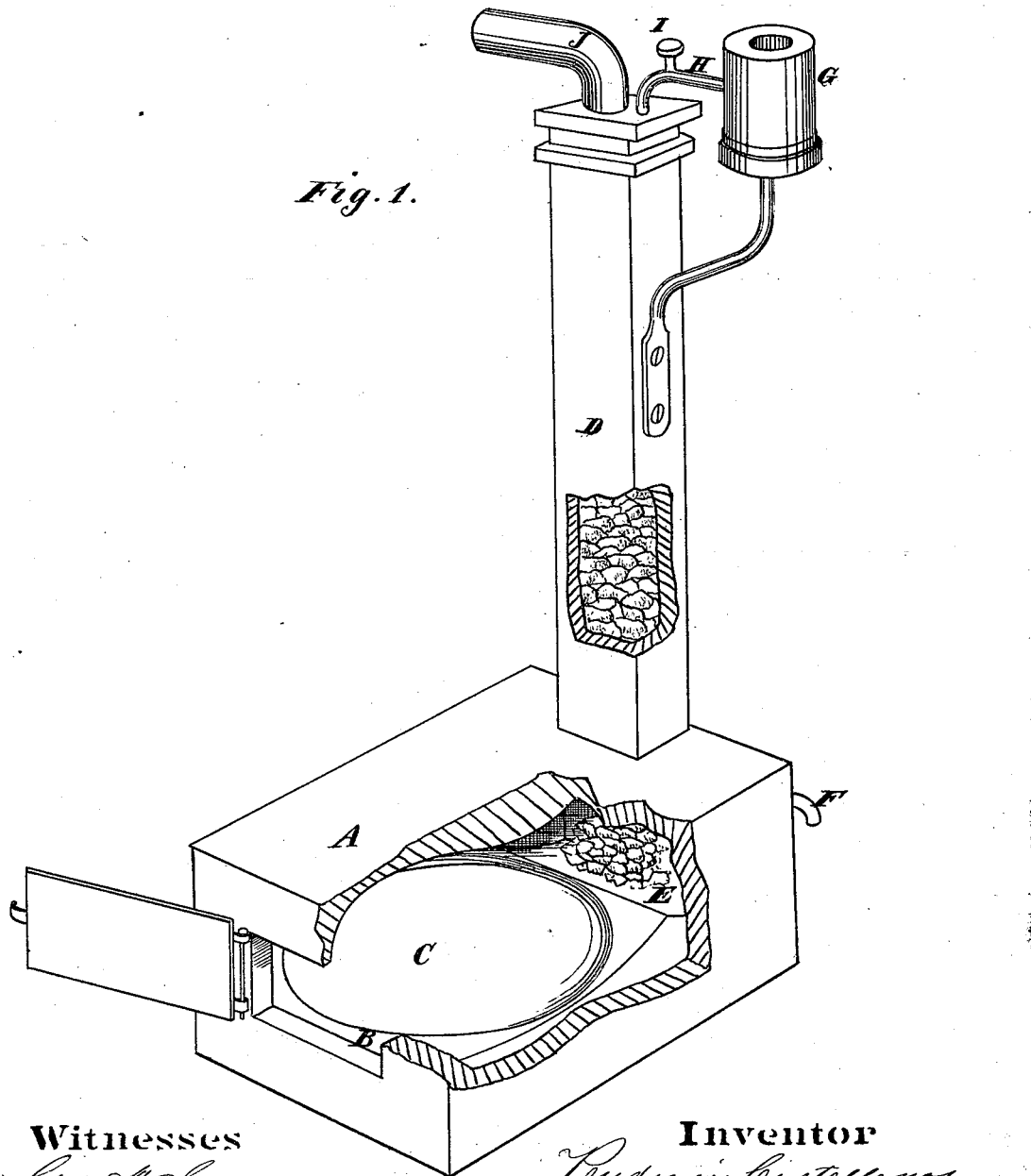

UNITED STATES PATENT OFFICE.

PRUDENCIO CASTELLANOS, OF SAN FRANCISCO, CALIFORNIA.

IMPROVEMENT IN APPARATUS FOR RECOVERING ACIDS FROM THE RESIDUUM OF NITRO-GLYCERINE MANUFACTURE.

Specification forming part of Letters Patent No. 164,262, dated June 8, 1875; application filed October 27, 1874.

CASE 3.

*To all whom it may concern:*

Be it known that I, PRUDENCIO CASTELLANOS, of San Francisco city and county, State of California, have invented an Apparatus for Separating and Utilizing Products Remaining after the Manufacture of Nitro-Glycerine; and I do hereby declare the following description and accompanying drawings are sufficient to enable any person skilled in the art or science to which it most nearly appertains to make and use my said invention without further invention or experiment.

My invention relates to an apparatus which is to be used more especially for the purpose of separating and utilizing the products remaining in the compound which is left after the manufacture of nitro-glycerine is completed; but the apparatus is also useful for the continuous concentration of other dilute acids or saline solutions, these concentrations being carried on without interruption.

My apparatus consists of a furnace suitable either for the combustion of ordinary fuel in the case of simple concentration; but in the present case it should be made so as to allow of the combustion of sulphur for the production of sulphurous acid, and in combination with this furnace I employ a chamber or tower, which may be properly called both a condensing and evaporating chamber. This chamber is so constructed as to divide the liquid (which is fed to it in small quantities from a suitable containing-tank) into small streams, which pass downward between the obstructions with which the chamber is filled, and meet the sulphurous acid gas which arises through the chamber. Decomposition ensues, and the sulphuric acid continues to flow downward to a suitable outlet, while the gaseous products and steam pass out at the top, and are conducted to the proper chamber to form a new compound.

Referring to the accompanying drawing for a more complete explanation of my invention, the figure is a perspective view of my apparatus.

A is a furnace, constructed in any suitable manner, and provided with a fire-place, B, for the combustion of fuel. Above this fire-place is a shallow pan or hearth, C, for the combustion of sulphur, thus producing sulphurous acid.

The chamber D is of considerable height, like a chimney, and is filled with coarse rack, or otherwise obstructed, for a purpose to be hereafter described. The lower part of this chamber connects with a flue from the space above the hearth C, so that the sulphurous acid will pass directly to the chamber and arise through the obstructions. The bottom E of the chamber is inclined outward, and a discharge-pipe, F, serves to convey the concentrated sulphuric acid to a suitable receptacle.

Above the chamber D, and a little to one side, is placed a tank, G, which contains the compound of nitric acid, sulphuric acids, and other substances which remain after the manufacture of nitro-glycerine, and a pipe, H, with a stop-cock, I, serves to deliver this compound in a small but continuous stream into the top of the chamber D, through which it passes, being subdivided into minute streams by the obstructions before mentioned.

The heat from the furnace, together with the sulphurous acids, produces a decomposition of certain portions of the compound, as is more fully described in another application for Letters Patent made by me in this connection, and these are conveyed away by the pipe J to the chambers where they are to be used, while the sulphuric acid, deprived of its impurities and the water by which it was diluted, descends to the escape-pipe F, and is there drawn off.

It will be manifest that this form of apparatus can be utilized for the rapid evaporation of other acids or saline solutions by simply employing ordinary fuel, in place of the sulphur-chamber.

Having thus described my invention, what I claim, and desire to secure by Letters Patent, is—

The furnace A, with its hearth C, for producing heat and sulphurous acid, in combination with the vertical chamber or tower D, with its inclined floor E and obstructions, as shown, the tank G, inlet-pipe H, and discharge-pipes F and J, substantially as and for the purpose herein described.

In witness whereof I hereunto set my hand and seal.

PRUDENCIO CASTELLANOS. [L.S.]

Witnesses:
  GEO. H. STRONG,
  C. M. RICHARDSON.